United States Patent [19]
Scholes

[11] 3,876,410
[45] Apr. 8, 1975

[54] METHOD OF APPLYING DURABLE LUBRICOUS COATINGS ON GLASS CONTAINERS

[75] Inventor: Addison B. Scholes, Muncie, Ind.

[73] Assignee: Ball Brothers Company Incorporated, Muncie, Ind.

[22] Filed: Nov. 24, 1972

[21] Appl. No.: 309,380

Related U.S. Application Data

[60] Continuation of Ser. No. 889,830, Dec. 24, 1969, abandoned, which is a division of Ser. No. 642,994, April 27, 1967, abandoned, which is a continuation-in-part of Ser. No. 543,620, April 19, 1966, abandoned.

[52] U.S. Cl. .......... 65/60; 117/71 R; 117/72; 117/88; 117/102 A; 118/48
[51] Int. Cl. .......... C03c 17/06
[58] Field of Search ........ 65/24, 30, 60; 117/124 D, 117/124 A, 71 R, 72, 102 A, 88, 106 R; 118/48, 49

[56] References Cited
UNITED STATES PATENTS

| | | | |
|---|---|---|---|
| 2,132,138 | 10/1938 | Williams et al. | 117/6 |
| 2,418,055 | 3/1947 | Smith et al. | 118/48 X |
| 2,437,606 | 3/1948 | Kauffman et al. | 118/48 X |
| 2,557,379 | 6/1951 | Hancock et al. | 118/48 |
| 2,813,045 | 11/1957 | Abbott | 117/124 D X |
| 2,831,780 | 4/1958 | Deyrup | 65/62 |
| 2,995,533 | 8/1961 | Parmer et al. | 260/123 |
| 3,004,863 | 10/1961 | Gray et al. | 65/30 |
| 3,130,071 | 4/1964 | Brocket et al. | 117/124 |
| 3,161,534 | 12/1964 | Dettre | 117/69 |
| 3,201,290 | 8/1965 | Wyss | 118/48 |
| 3,258,444 | 6/1966 | Santelli | 260/30.4 |
| 3,353,514 | 11/1967 | Lyle | 118/49 |
| 3,438,803 | 4/1969 | Dubble et al. | 65/30 X |
| 3,441,399 | 4/1969 | Leverne et al. | 65/60 |
| 3,561,940 | 2/1971 | Scholes | 65/60 |

*Primary Examiner*—Robert L. Lindsay, Jr.
*Attorney, Agent, or Firm*—Gilbert E. Alberding

[57] ABSTRACT

This invention pertains to a method of coating vitreous surfaces, advantageously precoated with a metal oxide, by exposure to the chemically unchanged vapor of a coating composition, particularly fatty acids, to apparatus including vaporizers and fans to accomplish the method, and to vitreous articles, particularly glassware, so coated.

11 Claims, 13 Drawing Figures

INVENTOR
ADDISON B. SCHOLES

ATTORNEYS

INVENTOR.
ADDISON B. SCHOLES

Campbell, Harris and O'Rourke
ATTORNEYS

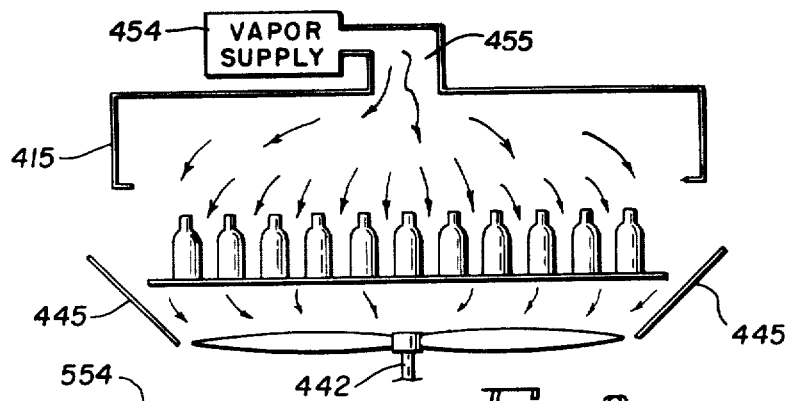
Fig.8
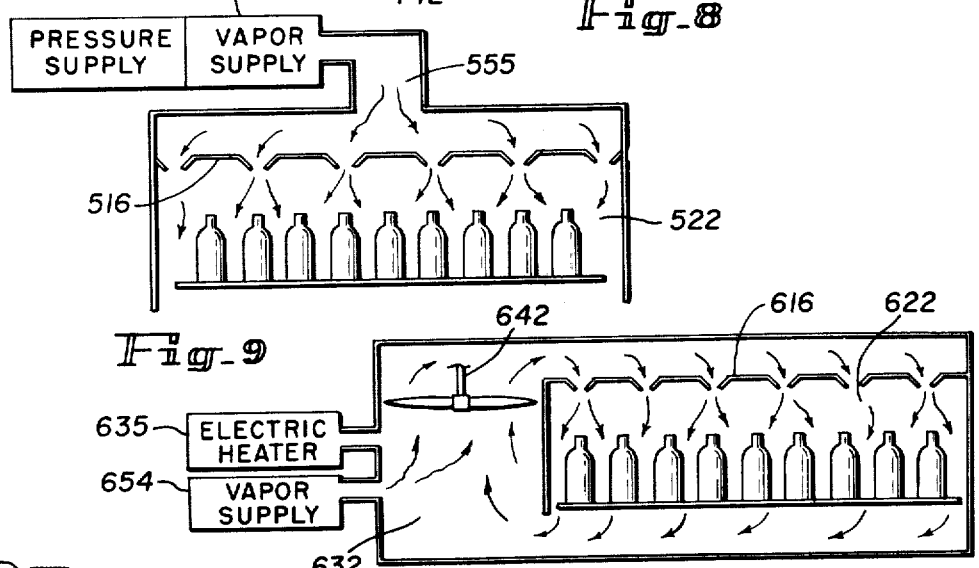
Fig.9
Fig.10
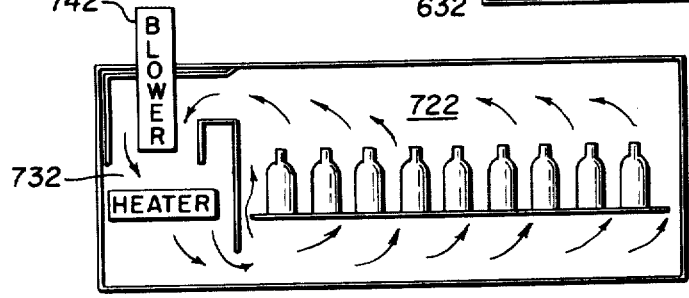
Fig.11
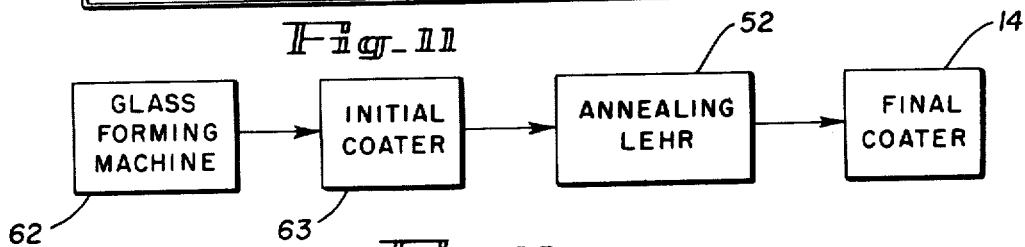
Fig.12
INVENTOR.
ADDISON B. SCHOLES
Campbell, Harris and O'Rourke
ATTORNEYS

METHOD OF APPLYING DURABLE LUBRICOUS COATINGS ON GLASS CONTAINERS

This application is a continuation of my earlier copending application Ser. No. 889,830, filed Dec. 24, 1969 which, in turn, is a division of my still earlier then copending application Ser. No. 642,994 filed Apr. 27, 1967 which, in turn, is a continuation-in-part of my yet earlier then copending application Ser. No. 543,620, filed Apr. 19, 1966, all of which earlier copending applications have now been abandoned in favor of this present application.

This invention relates to a durable, lubricous coating and, more particularly, relates to a substantially uniform thin coating formed on vitreous articles, such as glass, by exposing said articles to the vapor of a suitable coating compound, to a process for forming such a coating on articles, and to apparatus for applying such a coating to articles.

Formation of durable lubricous coatings have been found to be of great importance, particularly in industries such as glass container industries, to provide articles, or ware, with at least one layer of an adhering lubricating material in order to facilitate high speed automatic handling in production lines, to protect articles against contact abrasion damage, and to prevent unsightly scuff and scratch damage. In this regard, uncoated glass articles are highly susceptible to abrasion damage, and it has been reported that newly formed uncoated glass articles can quickly lose up to 75% bursting strength due, at least in part, to surface abrasion caused by contact with other glass articles as normally occurs during processing and handling of such articles.

Numerous attempts have been made, heretofore, to provide various coatings for articles, but none of the known coatings have been completely successful in providing a durable, lubricous coating that is fully acceptable in quality, cost, and application. In addition, some prior coatings have also proven to be unsatisfactory for use on containers for food and/or have caused undesirable labeling problems.

While some coatings have been applied to articles just prior to use, it is evident from the foregoing that to be fully effective, the articles must be coated soon after they are formed, and in the case of annealed articles, for example, such coatings have been applied immediately before and/or after annealing.

With respect to post annealing coating applications, one of the more common causes of unacceptability has been due to the lack of durability and strength of the coating, and while some pre-annealing coating applications have overcome this deficiency to some extent, other factors, such as, for example, lack of lubricity, nonuniformity of coating, or excessive time requirements have prevented known coatings of this type from being completely acceptable.

The combination of both pre-annealing and post annealing applications to form a dual coating on the surface of glass articles has lately gained considerable acceptance, but known dual coatings, like their predecessors, also have not been completely successful in providing acceptable durable, lubricious coatings that are easily applied and yet are low in cost, due, at least in part, to the lack of a completely acceptable post annealing coating.

Three methods have been suggested for applying post annealing coatings to the surface of glass articles. Of these, either dipping the ware into a liquid state coating material solution or spraying such a solution onto the ware have commonly been utilizied, while exposing the ware to the vapor of a coating material has not heretofore been deemed practical for production use. However, while both dipping and spraying of the ware to provide a coating have been used to a considerable extent, both have failed to gain complete acceptance due, at least in part, to lack of durability, and/or difficulty in application such as lack of uniformity of coverage, lack of adequate control of thickness of coating or spots, loss of coating composition to the atmosphere, excessive coating on more accessible surfaces leading to unsightly ware, inability to adequately coat closely spaced articles, poor label adhering characteristics, and/or difficulty in application to food containers having uncovered openings therein.

While it is known that vapor coating involving chemical decomposition and/or reaction has been suggested heretofore for use in coating ware heated to an elevated temperature, and while it has been heretofore suggested that annealed articles can be passed over a heated container giving off vapor to thus acquire a coating, no known acceptable apparatus or method exists, suitable for production usage, for quickly and uniformly applying a coating to a plurality of articles (including closely spaced articles) by vapor exposure utilizing a minimum of vapor and without necessitating heating of the article to an elevated temperature or resulting in excessive vapor losses. Most of the previous vapor coating methods involved chemical reaction and accompanying severe conditions rather than a simple physical vaporization and coating of an unchanged composition.

While the coating of this invention is particularly well suited for use with articles such as glass articles, and is so described hereinafter, it is also usable with other vitreous articles such as china, quartz, or the like, and the coating is likewise usable for other high energy surface materials, such as metals, oxides, and the like.

It is therefore a feature of this invention to provide novel apparatus and method for forming coatings by vapor exposure, either as a single coating or in conjunction with a pre-annealing coating (glass articles), and it is also a feature of this invention to provide such coatings, formed from vaporizable coating materials not heretofore used for this purpose, that are fully acceptable as to quality, cost, and application, and, in addition, can be used on food containers and have good labeling characteristics.

It is therefore an object of this invention to provide new and improved coatings for articles, as well as to provide an improved method for applying said coatings, together with heretofore unknown apparatus for coating such articles by vapor exposure.

It is another object of this invention to provide a method and apparatus for applying improved coatings to articles by exposing said articles to the vapor of a vaporizable coating material in a suitable enclosure.

It is still another object of this invention to provide a method and apparatus for coating articles by moving hot air, containing contact adhering coating material through an area having articles to be coated therein, at a sufficiently high flow rate to cause a coating to be quickly deposited on said articles.

It is yet another object of this invention to provide a method for coating articles wherein a uniformly thin coating is assured even when the articles are closely spaced and wherein the bottoms of the articles are also coated.

It is still another object of the invention to provide a coating for glass articles that is formed by exposing said articles to the vapor of a coating material containing polyethylene in a heated enclosure.

It is yet another object of this invention to provide a superior coating for vitreous articles that is adhered to a prior applied oxide coating on said articles, as well as a process and apparatus for providing said dual coatings.

It is still another object of this invention to provide a dual coating for glass articles wherein a metallic oxide coating, such as tin or titanium, is first applied to the articles and thereafter an outer coating is applied by exposing said articles to the vapor of a coating compound, such as polyethylene, as well as a process and apparatus for accomplishing this end.

With these and other objects in view which will become apparent to one skilled in the art as the description proceeds, this invention resides in the novel article, method and apparatus substantially as hereinafter described, and more particularly defined by the appended claims it being understood that such changes in the precise embodiments of the herein-disclosed invention are meant to be included as to come within the scope of the claims.

The accompanying drawings illustrate several examples of the invention according to the best modes so far devised for practical application of the principles thereof and in which:

FIGS. 5 through 11 are schematic illustrations of alternate embodiments that can be utilized to apply a coating to glass articles by vapor exposure according to this invention;

FIG. 12 is a block diagram showing the general arrangement of apparatus for applying a dual coating to a glass article according to this invention.

Figure 1:
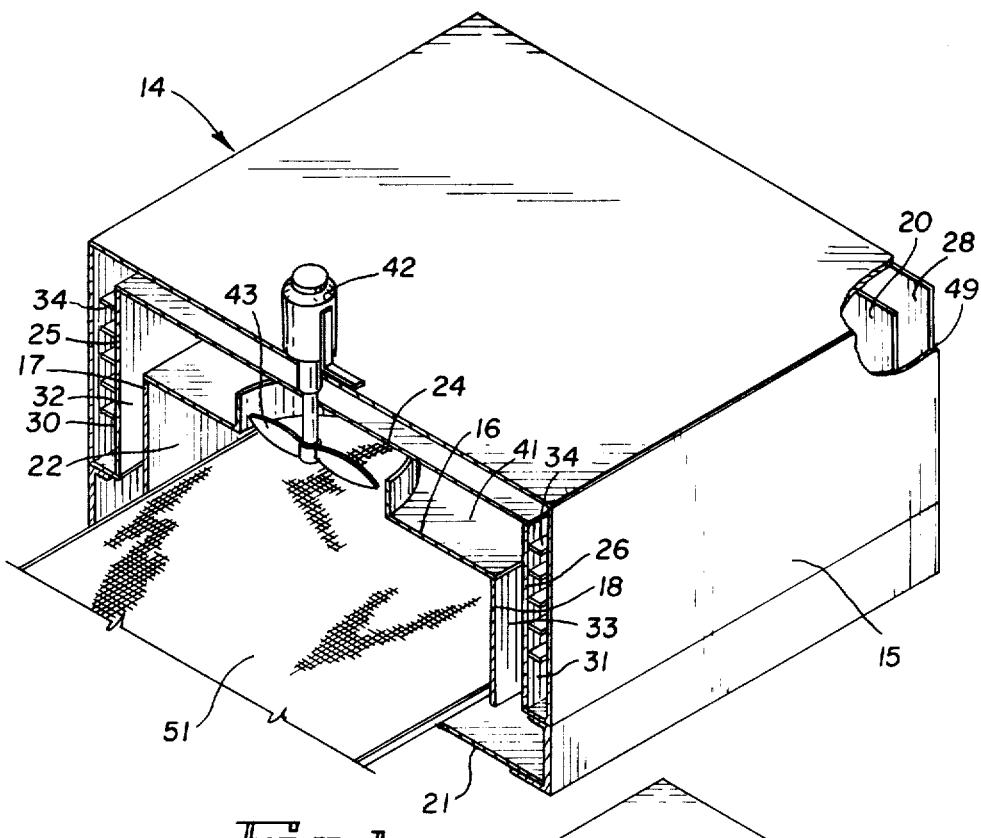
FIG. 1 is a partially cut-away perspective view of one embodiment of the coating apparatus made according to this invention for forming a durable coating by vapor exposure on a glass article in accordance with the process of this invention.

The lubricous coating of this invention is applied to glass articles by exposing said articles to the vapor of a vaporizable coating material capable of adhering to the surface of the articles upon contact therwith. It is believed that the superior coating of this invention is achieved by exposing the articles to the vapor while the articles are hydrophilic in a state of high energy surface and capable of accepting a coating and forming a strong bond between the coating and surface. As the molecules of the vapor coating attach themselves to the high energy surface of the glass, the energy level diminishes and falls to a low value after the entire surface has been coated with a single molecular layer. This process may be conveniently termed monomolecular vapor adherence. Since the surface has now been satisfied, appreciable further coating is precluded and hence the coating is essentially monomolecular in thickness.

In achieving a good coating on the surface of ware by the method of this invention, a number of variables must be considered. Among these are the coating material utilized (which determines the types of molecular vaporized), the rate of molecular bombardment of ware (which depends upon the rate of vapor-containing air movement and concentration of vapor in the air), the relative temperatures of the vapor-containing air and ware to be coated, and the time of exposure.

It is, of course, vital that the vapor contact the article in order for the coating material to adhere to the surface and form a complete coating layer thereon. It has been found that excellent results can be obtained with a minimum of vapor by directing the vapor-containing air at the ware with intense air movement. It has also been found that the moving vapor-containing air within the coating area, or enclosure, is preferably heated to a temperature above the vaporization point of the coating material selected, while the temperature of the article is preferably, but not mandatorily, maintained lower than that of the enclosure for most coating materials. Coating of the material is rapid and takes only minutes, or in some cases, only seconds, as it must when the coating is applied as the articles are removed from the lehr, when the vapor-containing air is constantly propelled at a high flow rate toward the articles to be coated.

The coating material utilized must be a material that is, at least in part, vaporizable at a readily obtainable temperature and capable of producing vapor that is contactadherent to the article to be coated to produce a durable and tenacious, lubricous coating. In general, acceptable coating material can be formed from organic materials, particularly hydrocarbons formed from methylene, ethylene, propylene, butylene, fatty acids and their derivatives, and the like. To be particularly effective, the vapor molecules of the coating material should be of a polar-nonpolar nature such that the polar portion of the molecule will tend to adhere strongly to the article to be coated and oriented so that the nonpolar portion of the molecule forms the lubricous external surface. It has been found that the vapor molecules of polyethylene are of this nature and polyethylene is therefore particularly well suited for use as the coating material to be utilized. Moreover, the polyethylene utilized may be in the form of a compound or mixture in which polyethylene may be combined with a carrier such as water and dispersing agent such as polyoxyethylene monostearate, as well as being utilized in its solid unchanged form. It is desirable that aqueous dispersions of polyethylene be acceptable for human use and not contain ingredients physiologically or physically objectionable when associated with food products.

A particularly useful group of coating compositions are the saturated and unsaturated fatty acids containing between 10 and 18 carbon atoms. When vaporized and conducted to the vicinity of newly formed glassware, these materials readily adhere to the glassware in a thin, clear, tenacious, lubricous coating. In order to maintain the surface energy of the glassware at a high level, it is advantageous to maintain the glassware at a temperature between about 100° F. and 325° F., and preferably at a temperature between about 120° F. and 250° F.

Newly formed glassware has a great affinity for the coating compositions of the instant invention. However, once exposed to the vapor of the coating compositions, it appears that a coating of substantially monomolecular depth is formed and that this coating has little affinity for condensing other moleculars from the vapor of the coating composition. This strong differentiation in the tendency to adhere permits great economy and efficiency. The vapor of the coating composition strongly tends to adhere when it is needed, i.e., on newly formed glassware, and resists superfluous coating on already coated glassware. High concentrations of vapor permit rapid coating and the predisposition to coat only upon uncoated glassware precludes uneconomical overcoating of the glassware.

Caporic acid, stearic acid, oleic acid, myristic acid, linolic acid, and palmatoleic acid, are typical of the compositions yielding desirable coatings on glassware when used according to the method of the instant invention. Of these compositions, one yields particularly desirable results. This preferred composition is oleic acid. Oleic acid is a bland liquid in normal condition having an appearance similar to that of cooking oil. It has been approved for use in connection with food products. As little as one drop of oleic acid every 17 seconds has been found sufficient to produce a superior lubricating coating on catsup bottles passing through the vapor at the rate of eighty bottles per minute. Thus, one drop of oleic acid provides sufficient vapor to coat about twenty catsup bottles. Further, oleic acid is readily available in a high-grade quality at low cost.

The vapor of the coating material selected must, of course, be provided in the coating area. This vapor may be produced at a point remote to the coating area and conducted thereto, or the coating material itself may be sprayed into a heated enclosure and vaporized therein before being brought into contact with the articles to be coated.

When dual coatings are formed on glass articles, a metallic oxide coating is first formed on the surface of the articles, and this coating is preferably formed substantially immediately after the articles are formed and before the articles are annealed. This coating may be formed on the articles in a known manner and preferably is formed by exposing the articles to the vapor of a heat decomposable metallic compound while the articles are heated to a temperature above the decomposition point of the compound. Excellent results have been achieved by coating articles substantially immediately after forming by means of the vapor of a tin compound and while the articles retain sufficient heat of formation to be still at a temperature above the decomposition point of the compound to thereby form a tin oxide coating on the surface of the article by chemical reaction between the vapor and the heated glass surface. In addition, titanium may be utilized, if desired, to form a titanium dioxide coating on the surface of the article in the same general manner.

Suitable metallic compounds may be either organic or inorganic in nature, and may be, for example, an organic salt such as a metallic halide or organic metallic compound such as alkyl aryl tin or isopropyl titanate, etc. Tin compounds such as stannous chloride, stannic chloride, stannous fluoride, diethyl isobutyl tin, diisopropyl tin dibromide, etc., have been found to be particularly useful in forming the tin oxide coating on the glass article. Titanium compounds such as titanium tetrachloride or tetra-isopropyl titanate likewise have been found to be particularly useful in forming a titanium dioxide coating on the glass article.

The oxide coating is advantageously formed on the glass articles in an enclosed chamber having a substantially uniform vapor atmosphere, and preferably in a chamber in which the vapor surrounds the glass. The employment of a chamber with an exhaust facilitates the removal of the composition products from the chamber and facilitates the presence of a sufficiently high concentration of active and substantially uniform vapor in the chamber to form the colorless, uniform, oxide coating thereon.

The oxide coating formed on the articles is very thin and advantageously is less than about one-fourth wavelength of visible light in thickness. As a result, the film is invisible to the eye and does not significantly change the appearance of the article.

Referring now specifically to the drawings, a coating device 14, as shown best in FIG. 1, includes a hood 15 having an inner top wall 16 and inner side and end walls 17, 18, 19, and 20, which, together with botton plate 21 form an enclosure 22. In addition, hood 15 has an outer top wall 24 and outer side and end walls 25, 26, 27, and 28.

Figure 4:
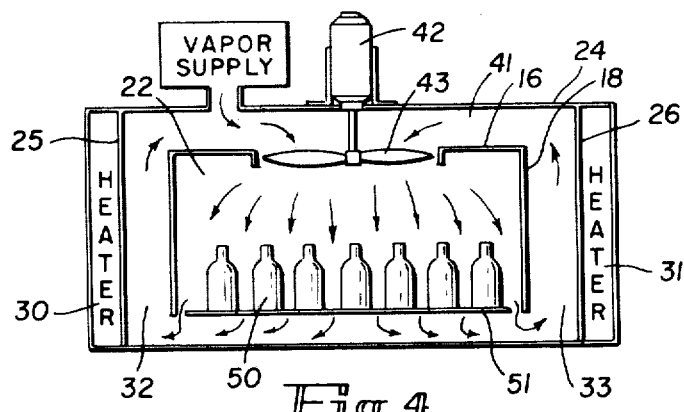
FIG. 4 is a shematic illustration showing the intense air circulation path within the apparatus shown in FIG. 1.

As shown in FIGS. 1 and 4, heating chambers 30 and 31 are mounted in conventional manner next to conduit 32 and 33, respectively, formed by the inner and outer side walls of the hood. Heating chambers 30 and 31 preferably each include a series of baffles 34 for uniformly distributing heat throughout each chamber, and heat is supplied to the chambers by means of a conventional gas heater (not shown) having conduits (not shown) leading from the heater to the lower end of heating chambers 30 and 31. Exhaust conduits (not shown) may also be provided at the upper end of chambers 30 and 31.

To provide an air circulation path, as shown in FIGS. 1 and 4, a conduit, or chamber, 41, formed by the inner and outer top walls 16 and 24, respectively, opens, at opposite ends, into the upper end of conduits 32 and 33, and opens centrally into the top of enclosure 22 at the low pressure side of a fan 42 mounted centrally within said enclosure in conventional fashion. The lower end of conduits 32 and 33 opens to the bottom of enclosure 22 above bottom plate 21. It is preferable that bottom plate 21 extend to the side walls of the hood to prevent loss of vapor.

The blades 43 of fan 42 are formed in a manner such that operation of the fan causes air to be propelled downwardly through the enclosure at an intense rate. As shown best in FIG. 4, the intense air circulation path is downwardly through the enclosure 22, out of the enclosure at the bottom to conduits 32 and 33, upwardly through conduits 32 and 33, and back into the top of the enclosure through top conduit 41. It has been found, for example, that a fan having two blades each with a radius of two and one-half feet and propelled by a two horsepower motor provided the needed intense air circulation.

Figure 2:
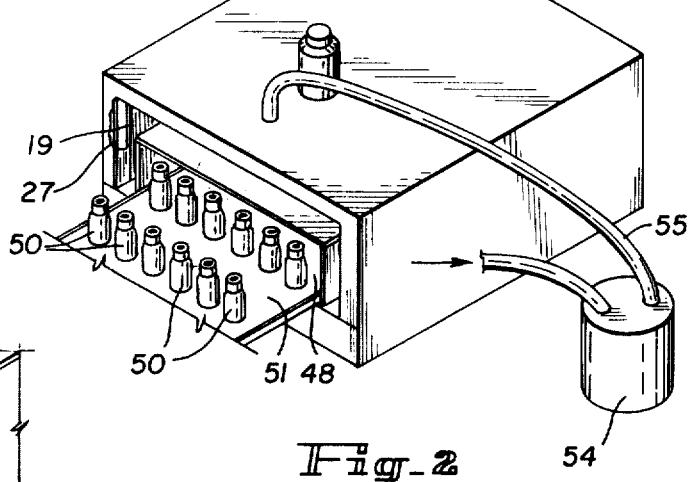
FIG. 2 is a perspective view of a vaporizer connected to the coating apparatus shown in FIG. 1 to supply vapor to said apparatus.

As shown in FIG. 1, the inner and outer end walls 19, 20, 27, and 28 of hood 15 extend downwardly a shorter distance than do the side walls 17, 18, 25, and 26, so that ingress and egress openings 48 and 49 are provided at each end of the hood to allow glass articles 50 to be coated to be introduced into the enclosure 22 within the hood and removed therefrom after coating. A foraminous conveyor, such as a webbed belt 51, is provided to convey articles through the enclosure 22, and as indicated in FIG. 12, the belt may be a lehr belt conveying articles directly from a lehr 52 to coating apparatus 14. The hood may be conventionally mounted on supports (not shown) anchored to the floor or may be suspended by supports (not shown) from any other convenient structure.

to provide vapor to enclosure 22, a conventional vaporizer 54, as shown in FIG. 2, may be provided, which vaporizer may utilize solid pellets of the vaporizable coating material, preferably polyethylene. Vapor is produced conventionally by heating the coating material within the vaporizer to a temperature above the vaporization point of at least a portion of that particular vaporizable material (about 250° F. for polyethylene). The vapor thus produced is then conducted through condiut, or tube, 55 to the enclosure 22 within the hood so that the vapor is diffused into the air within the enclosure and propelled downwardly through the enclosure to contact the articles to be coated. Due to the circulation path established, the vapor will, of course, be repeatedly propelled toward the articles to be coated and the only loss of vapor material will be that adhering to the articles, plus a negligible loss through the openings of the hood. Vaporizer 54 must have sufficient capacity to provide sufficient vapor to coat the articles passing through the enclosure, and it has been found that a vaporizer capable of producing vapor by heating one-half to two pounds of material per day produce excellent results.

Figure 3:
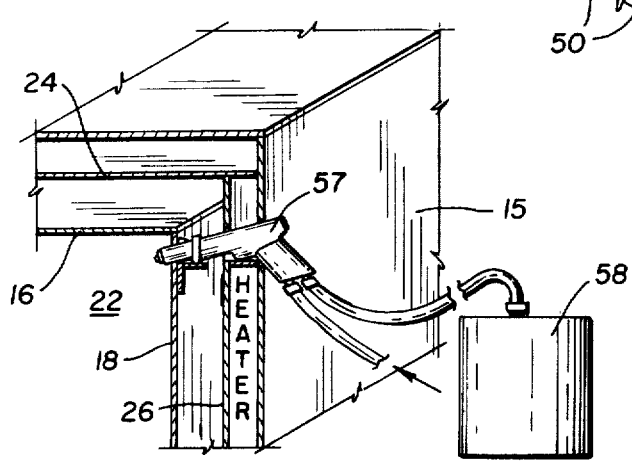
FIG. 3 is a partial perspective view illustrating the use of a spray gun for spraying coating material directly into the apparatus shown in FIG. 1.

If desired, the coating material can be sprayed directly into enclosure 22 within the hood 15, as shown in FIG. 3. To spray the material into the enclosure, a conventional spray gun 57, having a meterial reservoir 58, is conventionally mounted on the hood, near the top thereof, for example, as shown in FIG. 3, and spray directed into enclosure 22. Since the temperature within the hood is maintained above the vaporization point of the desired coating material, a large portion of the spray immediately vaporizes in the enclosure and the vapor is then propelled by the fan downwardly through the enclosure so that the vapor molecules contact the ware to be coated. It has been found that a spray gun having the capacity of spraying 1 ½ gallons of coating material per hour at a pressure of 40 psi provides excellent coating results. The concentration of useful solids in a spray suspension might beneficially range from about 0.05% to 0.50% by weight, the reaminder being a suitable carrier such as water.

It has been found that a limit exists as to the amount of vapor that can be added to the circulating air, which is believed to be saturation point of the air, and preferably vapor should be added to the enclosure at a rate sufficient to maintain the vapor at this concentrated vaporization level.

With respect to operating temperature, it has been found that when utilizing a coating material containing polyethylene, the temperature of the vapor-containing air within the enclosure is usually maintained between 180° F. and 400° F. with the preferable temperature being between 250° F. and 320° F., while the ware temperature when introduced into the enclosure may be between ambient and 400° F., but preferably is between 110° F. and 170° F. For the fatty acid coating materials, the vapor temperature range is the same, and the preferred ware temperature range is 120° F. to 250° F.

Figure 5:
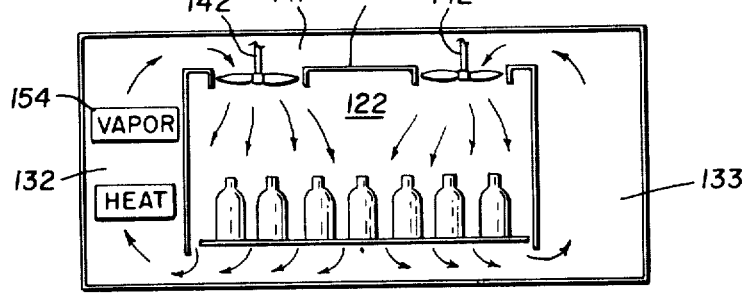

The coating device described hereinabove may be modified in a number of ways without departing from the intended scope of this invention. As shown in FIG. 5, for example, vaporizer 154 may be positioned within conduit 132 rather than being externally positioned with respect to the coating apparatus, and a plurality of fans 142 may be provided below a plurality of openings in top wall 116 to insure uniform downward movement of the vapor-containing air through enclosure 122. As shown schematically in FIG. 5, the circulation provided through conduits 132 and 141 will cause the new vapor produced to be constantly integrated into the rapid circulation system provided, and, of course, other vaporizers (not shown) could be added, for example, in conduits 133 or 141.

Figure 6:
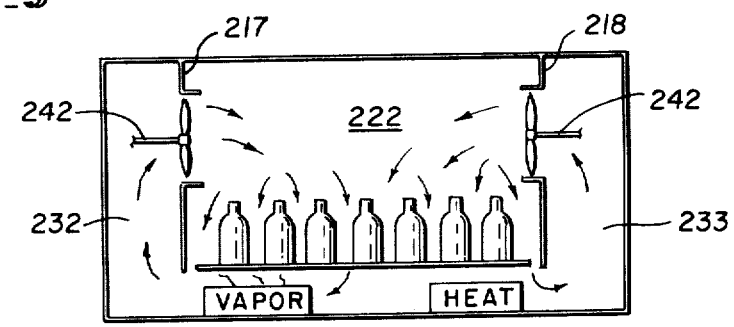

As shown in FIG. 6, the vapor may also be produced at the bottom of enclosure 222 and introduced into the enclosure through side condiuts 232 and 233. Fans 242 could also be mounted on the interior side walls 217 and 218 of the enclosure, adjacent to the openings in said side walls, to force the air through the coating area, or enclosure, to contact the ware to be coated still at an angle to its path of travel through the enclosure. The circulation path in this case will, of course, still be out the bottom of the enclosure to the side conduits so that vapor is constantly added to the circulating air.

Figure 7:
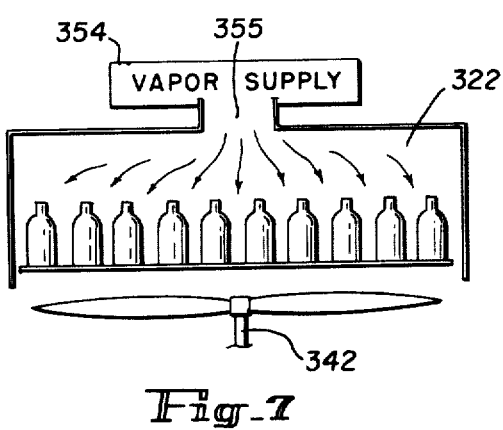

As shown in FIG. 7, fan 342 can also be placed below the ware and operates as an exhaust fan to propel vapor, introduced into the top of enclosure 322 through conduit 355 from vapor supply 354, downwardly past the articles to be coated and out through the bottom of the coating apparatus. As indicated in FIG. 7, the return path could also be eliminated provided that the vapor produced is sufficient to coat the articles and if the loss of material can be tolerated. As shown in FIG. 8, the side walls of the hood can be eliminated, where no return path is desired, by suitable air-directing panels 445, adjacent to fan 442, for example, the vapor being directed to the coating area through hood 415 and conduit 455 from vapor supply 454.

As shown in FIG. 9, top wall 516 may have a series of openings therein to assure uniform air movement through enclosure 522, and vapor may be introduced into the top of the enclosure under pressure from vapor supply 554 through conduit 555 so that vapor is moved uniformly downwardly through the entire enclosure.

Still another possible modification is shown in FIG. 10, wherein the fan 642 is placed in a single side conduit 632, and top wall 616 has a plurality of openings therein in the same manner as does the top wall shown in FIG. 9. The intense air circulation path is provided by opening the bottom of the conduit 632 to the bottom of the enclosure 622, while vapor and heat are externally supplied to the conduit from vapor and electric heat supply sources 654 and 635, respectively.

In addition, air movement within the enclosure may be in an upward direction, as shown in FIG. 11, and a blower 742 may be provided in conduit 732 to propel the air downwardly through the conduit and hence pull the air upwardly through enclosure 722 to form the air circulation path.

In operation, ware to be coated is conveyed on the coating apparatus on a foraminous belt and preferably slowly advanced on the belt through the coating enclosure. The time that the articles are allowed to remain in the coating enclosure depends upon the other variables as brought out hereinabove, but, for most desirable results, must be retained in the enclosure for a period sufficient to completely coat the articles. It has been found that after a complete coating layer is formed, very little additional coating will be deposited so that the upper time limit is therefore not critical. A satisfactory coating has been achieved with the article exposed for as little as fifteen seconds and as much as 1½ hours, but it has been found preferable, in most cases, to maintain the articles exposed to the vapor in the enclosure for a period of between 60 seconds and 300 seconds. The coating is very thin, being preferably less than about one-fourth wavelength of visible light, and thus is not in any way apparent on the coated articles, and is substantially uniform, extending over the bottom as well as the sides of the article.

When the exterior coating applied by coating apparatus 14 is to be applied after a pre-annealing coating, the coating is applied, as shown in FIG. 12, after the articles are formed on a conventional forming machine 62 (such as an Individual Section (IS) Machine), coated with an oxide coating in coater 63, and annealed in lehr 52. Coating apparatus 14 is placed a short distance (one-half to 10 feet) from the end of the lehr, and articles on the lehr belt are conveyed from the lehr directly to coating apparatus 14.

Figure 13:
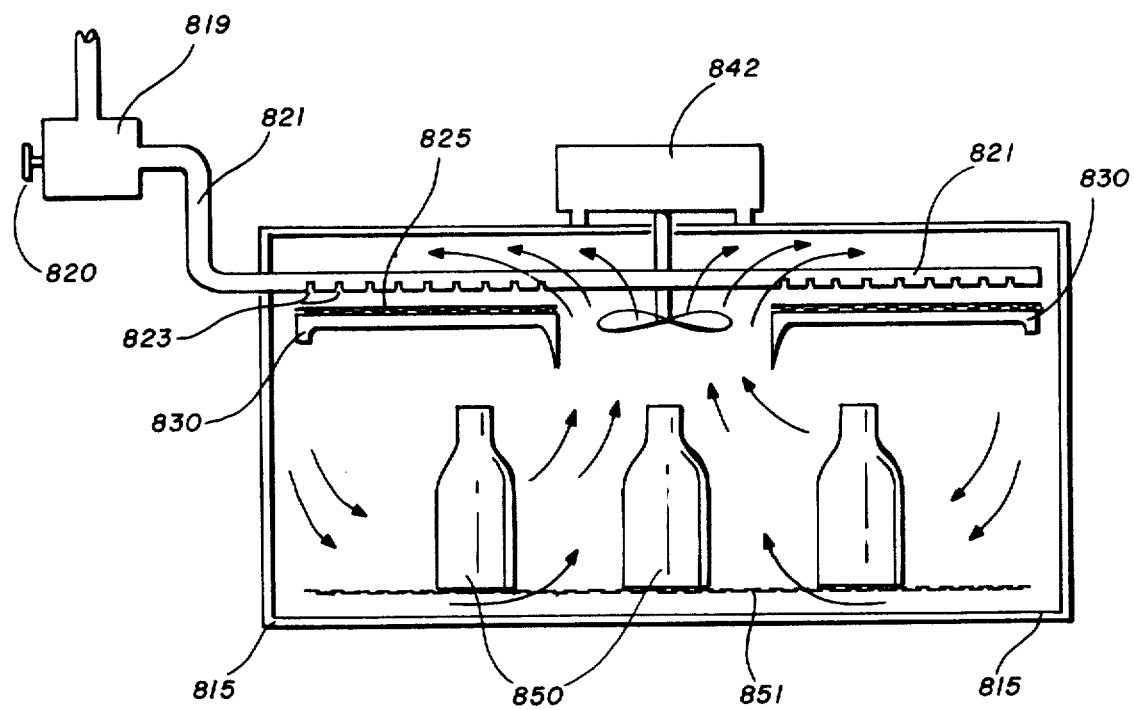
FIG. 13 is a schematic illustration of a particularly useful apparatus for coating glass with vaporized coating composition.

A particularly advantageous embodiment of the invention is shown in FIG. 13. In this embodiment, enclosure 815 surrounds belt 851 having thereon glassware 850. Atomized coating composition is introduced into the enclosure through conduit 821. Atomizer 819 changes the liquid coating composition into an atomized spray. Adjustment 820, such as a needle valve, controls the amount of coating composition introduced into enclosure 815. The atomizer can be any of the known means for this including a verturi or rapidly rotating disc. The portion of conduit 821 located over strip heating elements 825, have perforations 823. Thus, atomized coating composition passes through perforations 823 and strike heating strip 825 which vaporizes the small particles. Heating strips 825 are located on ducting 830. A motor 842 located on the top portion of the enclosure 815 drives fan 843 in such a direction as to induce upward flow of vapor. The vapor immediately after being propelled by fan 843, passes through the passage defined by enclosure 821 and ducting 830 and over heating strips 825 thereby carrying away the newly formed vapor of the coating composition. This enriched mixture follows the contour of enclosure 815 until it reaches the bottom side portion thereof. At that portion, it is influenced by the drawing force of fan 843 and passes, at least in part, under belt 851 and then upwards into contact with the glassware 850. It has been found that this embodiment provides optimum coating of the critical bottom and heel area of glassware 850.

Examples are set forth hereinafter to describe in more detail coating of glass articles as taught in this invention. It is intended, however, that these examples are illustrative only and are not meant to limit the invention to the specific details described therein.

EXAMPLE I

A coating apparatus as described hereinabove and shown in FIG. 1 was mounted on a 60-inch wide webbed belt and the enclosure heated to a temperature of 285° F. Solid state polyethylene was heated in an externally positioned vaporizer and the vapor thus produced introduced into the enclosure at a rate of one-half pound solid material per day. Rows of bottles, each row comprising 16 bottles, at a temperature of about 110° F., were passed through said coating apparatus on said webbed belt moving at a rate of 2½ feet per minute so that said bottles were exposed to vapor in the enclosure for a period of 120 seconds.

Samples of the coated bottles were selected and control samples were also selected from uncoated bottles which were made immediately preceding and succeeding the coated bottle articles. In addition, control samples were also selected and coated with stearate spray lubricating coating. Tests showed that the polyethylene coated bottles had an abrasive-resistant surface and after deliberate controlled abrasion had an average bursting strength of more than 100 psi over conventional stearate spray coated abraded bottles and more than 150 psi over uncoated abraded bottles. Tests also showed that the polyethylene coated bottles had a high lubricous surface with an average coefficient of friction of 0.16 compared with an average coefficient of friction for uncoated bottles of 0.80.

EXAMPLE II

The procedure of this example was the same as that of Example I, except that the enclosure was heated to a temperature of 320° F. Similar superior results were achieved as in Example I.

EXAMPLE III

The procedure of this example was the same as that of Example I, except that the temperature of the bottles introduced into the chamber was about 170° F. Similar superior results were achieved as in Example I.

EXAMPLE IV

The procedure of this example was the same as that of Example I, except that an aqueous solution of polyoxyethylene monostearate sold by Atlas Powder Company as MYRJ52S in a 0.1% solution was sprayed directly into the coating enclosure and vaporized therein. The vaporized coating was less protective than the polyethylene coating of Example I, but was superior to conventional sprayed stearate.

EXAMPLE V

The procedure of this example was the same as that of Example I, except that a mixture of a 0.05% aqueous solution of polyoxyethylene monostearate sold by Atlas Powder Company as MYRJ52S and a 0.2% dispersion of polyethylene was sprayed directly into the coating enclosure and vaporized therein. Similar superior results were achieved as in Example I.

EXAMPLE VI

The procedure of this example was the same as that of Example I, except that the bottles were left in the enclosure for a period of 60 seconds. Similar superior results were achieved as in Example I.

EXAMPLE VII

The procedure of this example was the same as that of Example I, except that the bottles were left in the enclosure for a period of 300 seconds. Similar superior results were achieved as in Example I.

EXAMPLE VIII

Stannic chloride vapor formed by bubbling argon from a pressure cylinder at a rate of about 10 cubic feet per hour through a vaporizer containing liquid stannic chloride at a temperature of about 100° F. was combined with a stream of argon having a flow rate of about 80 cubic feet per hour to form a vapor containing about 0.5% stannic chloride. The resulting vapor was directed onto the outer surface of a series of newly formed glass bottles as they passed on a conveyor from a forming machine to an annealing lehr. The temperature of the bottles during the coating operation was approximately 1,050° F. The coating was accomplished in an enclosed area with an exhaust to remove any objectionable decomposition products.

After being coated, the bottles were passed through an annealing lehr and thereafter processed in the same manner as that of Example VI.

Samples of the coated bottles were selected and control samples were also selected from uncoated bottles which were made immediately preceding and succeeding the coated bottles. The coated bottles were found to have an excellent coating thereon including the bottom, and were found to have a highly superior abrasive-resistant surface and, after controlled abrading, has an average bursting strength of more than 200 psi over uncoated abraded bottles.

EXAMPLE IX

The procedure of this example was the same as Example VIII, except that after annealing, the bottles were processed in the same manner as Example VII. The coated bottles showed similar superior results.

EXAMPLE X

A coating apparatus as described hereinabove and shown in FIG. 13 was mounted around a foraminous belt. Oleic acid was atomized in an atomizer and conducted into the enclosure. Therein it was sprayed into contact with heated strips thereby forming oleic acid vapor. Circulation of the vapor was accomplished by a fan operating in the manner shown in FIG. 13. Glassware entering the container on the belt was at a temperature somewhat above 200° F. Because of the heating strips and hot glassware, temperature gradients existed within the enclosure despite the rapid circulation. However, the vapor was maintained above the vaporization point of the oleic acid. The treatment resulted in formations of a completely transparent coating on the glassware. The only apparent change was a certain shininess to the glassware surface. Testing in the manner described in Example I shows a coefficient of friction of 0.1.

EXAMPLE XI

Glassware having a preliminary coating of tin oxide was coated in a manner identical with that described in the preceding example. The coefficient of friction of this glassware was 0.2, which is well within the satisfactory range, and the glassware displayed a more permanent lubricity.

EXAMPLE XII

Glassware was coated in the manner described in Example X with caproic acid being substituted for oleic acid. Similar advantageous results were obtained.

The foregoing description and examples show that this invention provides a heretofore unknown and superior coating for glass articles that is especially well suited for use by itself or in conjunction with a pre-annealing coating. In addition, this invention provides a superior method for coating glass articles by vapor exposure, as well as heretofore unknown apparatus for coating said articles.

It will be apparent from the above description and drawings that various modifications in the specific articles, method and apparatus described in detail may be made within the scope of the invention. Therefore, the invention is not intended to be limited to the particular designs, procedures and formulations except as may be required by the following claims.

What is claimed is:

1. A process for applying a substantially uniformly thin lubricous coating to the high energy exterior surfaces of newly formed glass containers, said process comprising the steps of:

providing said containers at a temperature of less than 400°F, supporting and conveying said provided glass containers in a spaced-apart relationship on top of a moving foraminous support, providing an enclosed housing about a predetermined length of said foraminous support, said enclosed housing having ingress and egress openings to permit entry and exit respectively of said glass containers on said moving foraminous support, producing a vapor atmosphere within said enclosed housing, said vapor atmosphere comprising the vapor of an organic, nonmetallic lubricous coating material having polar vapor molecules, heating said vapor atmosphere within said enclosed housing to maintain a vapor atmosphere temperature between 180°F and 400°F, maintaining the vapor atmosphere temperature sufficiently high to maintain the coating material in its chemically unchanged vapor state within said atmosphere, maintaining the container temperature sufficiently high to substantially preclude normal condensation of the vaporized coating material on the external container surfaces while yet sufficiently low to permit monomolecular vapor adherence of said coating material at energy sites on the external container surfaces, power driving said vapor atmosphere with a power driven fan within said enclosed housing to force said vapor atmosphere in contact with, around and past substantially all the exterior surfaces of said spaced-apart glass containers, return-directing said power driven vapor atmosphere within said enclosed housing to said power driven fan, and continuously and cyclically repeating said power driving and said return-directing steps at a sufficiently high repetition rate to thus produce a corresponding sufficiently high flow rate of said vapor atmosphere during the time said glass containers are passing through said housing to initially physically adhere said polar vapor molecules of said coating material to energy sites on the exterior container surfaces thus forming a substantially uniform monomolecular coating while continuing to expose the exterior container surfaces to said vapor atmosphere but thereafter forming additional coating at a substantially reduced rate of adherence as a result of the then lowered surface energy of the external container surfaces and as a result of the then reduced energy site availability whereby the external surfaces of the containers are effectively given a substantially uniformly thin lubricous coating substantially independent of variations in the vapor concentration of said coating material and/or the times of exposure thereto.

2. A process as in claim 1 wherein said temperatures of said provided containers and of said vapor atmosphere are both maintained at substantially 250°F.

3. A process as in claim 1 wherein said producing step comprises vaporizing a coating material selected from the group consisting of polyolefins, fatty acids and their derivatives.

4. A process as set forth in claim 3 wherein said fatty acids have between 10 and 18 carbon atoms.

5. A process as in claim 1 wherein said power driving step includes the forcing of said vapor atmosphere upwardly through said foraminous support.

6. A process at set forth in claim 1 further comprising the first step of applying an initial tin oxide coating to the external surfaces of said glass containers to thus provide said energy sites.

7. A process as set forth in claim 1 wherein the coating material comprises polyethylene.

8. A process as set forth in claim 1 wherein the coating material comprises oleic acid.

9. A process as set forth in claim 1 wherein said coating compounds comprise fatty acids having between 10 and 18 carbon atoms.

10. A process as in claim 1 wherein said external container surfaces are brought in contact with said vapor for a period of between about 60 to 300 seconds.

11. A process for applying a substantially uniformly thin lubricous coating to the high energy exterior surfaces of newly formed glass containers, said process comprising the steps of:
provproviding said containers at a temperature of between 110°F and 250°F,
supporting and conveying said provided glass containers in a spaced-apart relationship on top of a moving forminous support,
providing an enclosed housing about a predetermined length of said foraminous support, said enclosed housing having ingress and egress openings to permit entry and exit respectively of said glass containers on said moving foraminous support,
producing a vapor atmosphere within said enclosed housing, said vapor atmosphere comprising the vapor of an organic, nonmetallic coating material selected from the group consisting of polyolefins, fatty acids and their derivatives,
heating said vapor atmosphere with said enclosed housing to maintain a vapor atmosphere temperature between 250°F and 320°F,
maintaining the vapor atmosphere sufficiently high to maintain the coating material in its chemically unchanged vapor state within said atmosphere,
maintaining the container temperature sufficiently high to substantially preclude normal condensation of the vaporized coating material on the external container surfaces while yet sufficiently low to permit monomolecular vapor adherence of said coating material at energy sites on the external container surfaces,
power driving said vapor atmosphere with a power driven fan within said enclosed housing to force said vapor atmosphere through said moving foraminous support, in contact with, around and past the exterior surfaces of said spaced apart glass containers,
return-directing said power driven vapor atmosphere within said enclosed housing to said power driven fan, and
continuously and cyclically repeating said power driving and said return-directing steps at a sufficiently high repetition rate to thus produce a corresponding sufficiently high flow rate of said vapor atmosphere during the time said glass containers are passing through said housing to initially pnysically adhere vapor molecules of said coating material to energy sites on the exterior container surfaces thus forming a substantially uniform monomolecular coating while continuing to expose the exterior container surfaces to said vapor atmosphere but thereafter forming additional coating at a substantially reduced rate of adherence as a result of the then lowered surface energy site availability whereby the external surfaces of the containers are effectively given a substantially uniformly thin lubricous coating substantially independent of variations in the vapor concentration of said coating material and/or the times of exposure thereto.

* * * * *